(12) United States Patent
Han et al.

(10) Patent No.: US 8,023,058 B2
(45) Date of Patent: Sep. 20, 2011

(54) PANEL ASSEMBLY FOR DISPLAY DEVICE, DISPLAY DEVICE INCLUDING THE SAME, AND REPAIRING METHOD FOR DISPLAY DEVICE

(75) Inventors: Hye-Rhee Han, Suwon-si (KR);
Yeon-Kyu Moon, Seoul (KR);
Kyoung-Jun Jang, Tangjeong-myeon (KR)

(73) Assignee: Samsung Electronics Co., Ltd. (KR)

( * ) Notice: Subject to any disclaimer, the term of this patent is extended or adjusted under 35 U.S.C. 154(b) by 1317 days.

(21) Appl. No.: 11/349,475

(22) Filed: Feb. 7, 2006

(65) Prior Publication Data

US 2006/0187722 A1    Aug. 24, 2006

(30) Foreign Application Priority Data

Feb. 7, 2005  (KR) .......................... 10-2005-0011465

(51) Int. Cl.
*G02F 1/1333*      (2006.01)
*G02F 1/1343*      (2006.01)
(52) U.S. Cl. .......................................... 349/54; 349/139
(58) Field of Classification Search ...................... 349/54
See application file for complete search history.

(56) References Cited

U.S. PATENT DOCUMENTS

| | | | |
|---|---|---|---|
| 6,111,621 A * | 8/2000 | Kim et al. | 349/54 |
| 6,922,226 B2 * | 7/2005 | Park et al. | 349/149 |
| 7,027,043 B2 * | 4/2006 | Sakaki | 345/206 |
| 2004/0075800 A1 | 4/2004 | Sah et al. | |

FOREIGN PATENT DOCUMENTS

| | | |
|---|---|---|
| CN | 1385827 A | 12/2002 |
| CN | 1527268 A | 9/2004 |
| KR | 1020010005221 A | 1/2001 |
| KR | 1020020082361 A | 10/2002 |

* cited by examiner

*Primary Examiner* — Omar Rojas
(74) *Attorney, Agent, or Firm* — Cantor Colburn LLP

(57) ABSTRACT

A panel assembly for a display device and a display device having the panel assembly are provided. The panel assembly for a display device includes a display region including a plurality of pixels and most of display signal lines connected to the pixels, a plurality of repair lines disposed in a shape of a ring in a peripheral region outside of the display region, and first to third auxiliary repair lines disposed in the peripheral region in parallel to data lines. An additional auxiliary repair line is provided at a right side of each of the data driving IC regions. By doing so, occurrence of disconnection and success in repairing the disconnected data lines of a display penal which is mounted in a COG scheme is tested by using a TCP type of test unit, so that it is possible to greatly reduce production costs involved in the COG type test unit.

22 Claims, 8 Drawing Sheets

PANEL ASSEMBLY FOR DISPLAY DEVICE, DISPLAY DEVICE INCLUDING THE SAME, AND REPAIRING METHOD FOR DISPLAY DEVICE

BACKGROUND OF THE INVENTION (a) Field of the Invention

The present invention relates to a panel assembly for a display device, a display device including the same, and a repairing method of the display device.

(b) Description of the Related Art

The demand is increasing for flat panel displays, such as plasma panel assemblys ("PDPs"), organic light emitting displays ("OLEDs"), and liquid crystal displays ("LCDs").

PDPs are devices that display characters or images using plasma generated by gas-discharge. OLEDs are devices which display characters or images by applying an electric field to specific light-emitting organic or high molecule materials. LCDs are devices which display images by applying an electric field to a liquid crystal layer disposed between two panels, and regulating the strength of the electric field to adjust a transmittance of light passing through the liquid crystal layer.

The flat panel displays, for example, the LCD and the OLED, each include a panel unit provided with pixels including switching elements and display signal lines, and a gate driving IC for transmitting gate signals to gate lines among the display signal lines to turn on/off the switching elements of the pixels, a gray voltage generator for generating a plurality of gray voltages, a data driving IC for applying data voltages to data lines among the display signal lines, and a signal controller for controlling the components.

The signal controller and the gray voltage generator are disposed on a printed circuit board PCB which is located outside of the panel assembly. The driving IC is mounted on a flexible printed circuit film FPC which is located between the PCB and the panel assembly. Generally, two PCBs are provided. In this case, the two PCBs are disposed at upper and left sides of the panel assembly, and the upper and left side PCBs are referred as gate and data PCBs, respectively. The gate driving IC is disposed between the gate PCB and the panel assembly, and the data driving IC is disposed between the data PCB and the panel assembly. The gate and data driving ICs receive signals from the gate and data PCBs, respectively.

However, without the use of the gate and data PCBs, the gate and data driving ICs may be disposed just on an upper side of the panel assembly as a chip on glass (COG) type.

On the other hand, in order to detect defects such as disconnections and short-circuits during the production of the display device, various test processes are performed. For example, an array test, a visual inspection (VI) test, a gross test, and a module test are performed.

The array test is a test for detecting occurrence of disconnection of the display signal lines by applying a predetermined voltage and detecting the presence or absence of an output signal before a mother glass is divided into individual cells. The VI test is a test for visually detecting occurrence of disconnections of the display signal lines by assembling the upper panel with the lower panel and applying a predetermined voltage, after the mother glass is divided into the individual cells. The gross test is a test for detecting an image quality and occurrence of disconnections of the display signal lines by applying a voltage equal to an actual driving voltage and checking a display state on a screen before the driving circuit is mounted. The module test is a test for finally checking whether or not the driving circuit properly operates after the driving circuit is mounted.

In these tests, end portions of the gate lines and the data lines are formed as pads having wide ends in order to improve a contacting property to an external device.

Particularly, in order to perform the test under the same conditions as when driving the ICs, in the gross test, a gross test unit reproduces the same conditions as when driving ICs is used, and a test signal is applied by contacting probes such as needles connected to the gross test unit with the pads.

For example, when the data driving ICs are mounted on an FPC, the gross test unit mounts a test data driving IC on the FPC (a TCP (tape carrier package) scheme). Connection portions where wire lines are formed are disposed between the FPC and the probes, and signals are applied to the data lines through the probes disposed at end portions of the connection portions.

In addition, if the data driving ICs are mounted in a COG scheme, the test data driving IC is mounted on a glass substrate, and signals are applied to the data lines through the probes.

Here, the gross test includes two test steps. As described above, one step is a test of occurrence of disconnection of the display signal lines after a predetermined signal is applied through the gross test unit, and the other step is a test of success in repairing the disconnected signal lines.

In a case where the driving ICs are mounted in a COG scheme, the gross test unit must be a COG type of test unit that is suitable for the COG scheme.

However, unlike the TCP type test unit where the connection portions are separately provided, in the COG type test unit, the connected portions are provided in an integral form, and the COG type of test units matching with a resolution of the associated display device must be used. Therefore, since separate test units matching with the display devices having different resolutions must be manufactured, production costs increase.

In order to solve the problem in the production costs, a TCP type of test unit may be used to test the COG type of data driving IC. However, in a case of the TCP type of data driving IC, two auxiliary repair lines are connected at one side of the data driving IC, and in case of the COG type of data driving IC, two auxiliary repair lines are connected at both sides of the data driving IC, respectively. Therefore, due to the structural difference, there is a problem in that it is difficult to detect the repaired state after the disconnected signal lines are repaired.

SUMMARY OF THE INVENTION

The present invention provides a panel assembly that is capable of solving the aforementioned conventional problem and a display device having the panel assembly.

According to an aspect of the present invention, there is provided a panel assembly for a display device, including a display region including a plurality of pixels and most of display signal lines connected to the pixels, a plurality of repair lines disposed in a shape of a ring in a peripheral region outside of the display region, and first to third auxiliary repair lines disposed in the peripheral region in parallel to data lines.

In the above aspect of the present invention, the data lines may be disposed between the first auxiliary repair line and the second auxiliary repair line. In addition, the second auxiliary repair line and the third auxiliary repair line may be adjacent to each other, and the first to third auxiliary repair lines may intersect at least one of the repair lines.

The panel assembly may further include a plurality of data driving IC regions where data driving ICs for generating data voltages and applying the data voltages to the data lines of the display signal lines are mounted. The first to third auxiliary repair lines may be disposed in the data driving IC regions, and the third auxiliary repair line and the first auxiliary repair line disposed in the adjacent data driving IC regions intersect one of the repair lines at the same point.

According to another aspect of the present invention, there is provided a display device including a panel assembly having a display region including a plurality of pixels and most of display signal lines connected to the pixels and a plurality of repair lines disposed in a shape of a ring in a peripheral region outside of the display region, wherein the panel assembly includes first to third auxiliary repair lines disposed in the peripheral region in parallel to data lines of the display signal line for transmitting data voltages.

In the above aspect of the present invention, the data lines may be disposed between the first auxiliary repair line and the second auxiliary repair line. In addition, the second auxiliary repair line and the third auxiliary repair line may be adjacent to each other, and the first to third auxiliary repair lines may intersect at least one of the repair lines. The panel assembly may further include a plurality of data driving IC regions where data driving ICs for generating data voltages and applying the data voltages to the data lines of the display signal lines are mounted.

The first to third auxiliary repair lines may be disposed in the data driving IC regions, and the third auxiliary repair line and the first auxiliary repair line disposed in the adjacent data driving IC regions may intersect one of the repair lines at the same point. The data driving ICs may be mounted in a COG scheme, and the data driving IC regions may be disposed at equal intervals.

The panel assembly may further include data driving IC regions where data driving ICs for applying the data voltages to the data lines of the display signal lines are mounted, and the data driving IC regions may be provided with contact portions formed by extending the data lines and end portions of the first to third auxiliary repair lines.

In a case where at least one of the second auxiliary repair line and the third auxiliary repair line is connected to the repair line, a test unit wherein a test IC that is the same as the data driving IC is mounted may apply a test signal to the contact portion.

In addition, the test unit may include a TCP tape carrier package where the test IC is mounted, and a probe connected to a signal line which extends from the test IC. A portion of the probe may be connected to a contact portion formed by enlarging the data line, and a remaining portion thereof is connected to contact portions formed by enlarging the second and third auxiliary repair lines. The data driving ICs may be directly mounted on the panel assembly, and the data driving IC regions may be disposed at equal intervals.

According to still another aspect of the present invention, there is provided a panel assembly for a display device, including a plurality of data lines for transmitting data voltages, a plurality of data driving IC regions where data driving ICs for generating the data voltages and applying the data voltages to the data lines are positioned, and a plurality of auxiliary repair lines which are formed in the data driving ICs and disposed asymmetrically at both sides of the data lines.

The panel assembly may further include a plurality of repair lines which are insulated from the auxiliary repair lines to intersect the auxiliary repair lines, and some of the auxiliary repair lines are adjacent to each other. The data driving IC regions may be disposed at equal intervals.

According to a still further aspect of the present invention, there is provided a repairing method for a display device which includes a plurality of data lines for transmitting data voltages, a plurality of repair lines which intersect the data lines, and a plurality of auxiliary repair lines which are formed in a plurality of predetermined regions and disposed at both sides of the data lines, wherein at least some portions thereof intersect the repair lines. The repairing method includes steps of testing the data lines, connecting the data lines with at least one of the repair lines, connecting the repair lines connected to the data lines with at least one of the auxiliary repair lines, and applying a repair checking signal through the connected auxiliary repair lines.

In the above aspect of the present invention, a plurality of the auxiliary repair lines may be disposed at both sides of the data lines, and they may include first to third repair wire lines of which the second repair wire line and the third repair wire line may be adjacent to each other.

The display device may further include a plurality of data driving IC regions where data driving ICs for generating the data voltages and applying the data voltages to the data lines are mounted, or the data driving ICs may be directly mounted on the panel assembly.

In addition, each of the repair lines may include a first short-circuited point connected to the data lines and a second short-circuited point connected to the second or third auxiliary repair line, and each of the data driving ICs may include an amplifier connected between the first short-circuited point and the second short-circuited point.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE PREFERRED EMBODIMENTS

Figure 1:
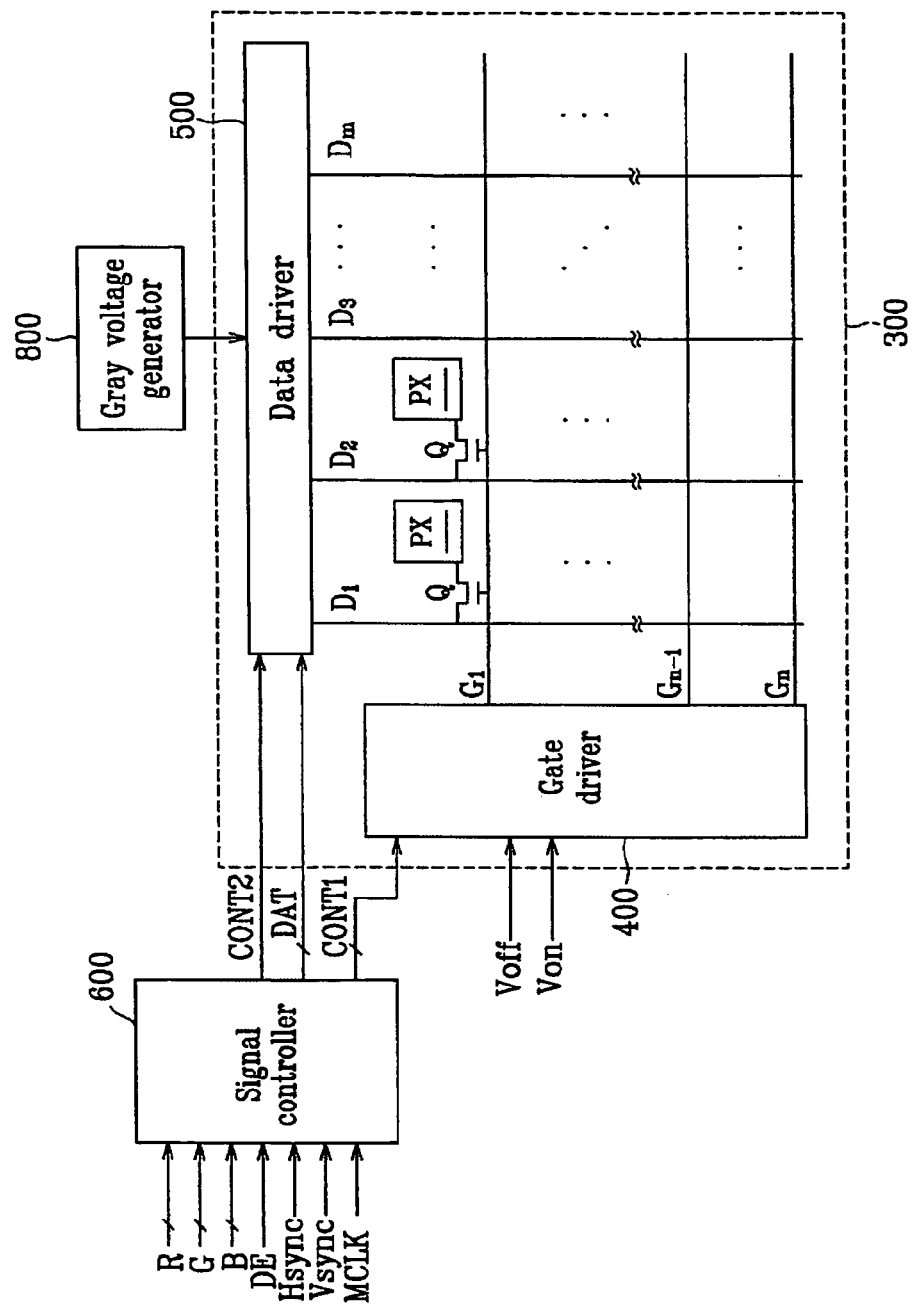
FIG. 1 is a block diagram showing a display device according to an embodiment of the present invention.

Hereinafter, exemplary embodiments of the present invention will be described in detail with reference to the attached drawings such that the present invention can be easily put into practice by those skilled in the art.

In the drawings, thicknesses are enlarged for the purpose of clearly illustrating layers and areas. In addition, like elements are denoted by like reference numerals in the whole specification. If it is mentioned that a layer, a film, an area, or a plate is placed on a different element, it includes a case that the layer, film, area, or plate is placed right on the different element, as well as a case that another element is disposed therebetween. On the contrary, if it is mentioned that one element is placed right on another element, it means that no element is disposed therebetween.

Now, a display device according to an embodiment of the present invention will be described in detail with reference to the accompanying drawings.

Figure 2:
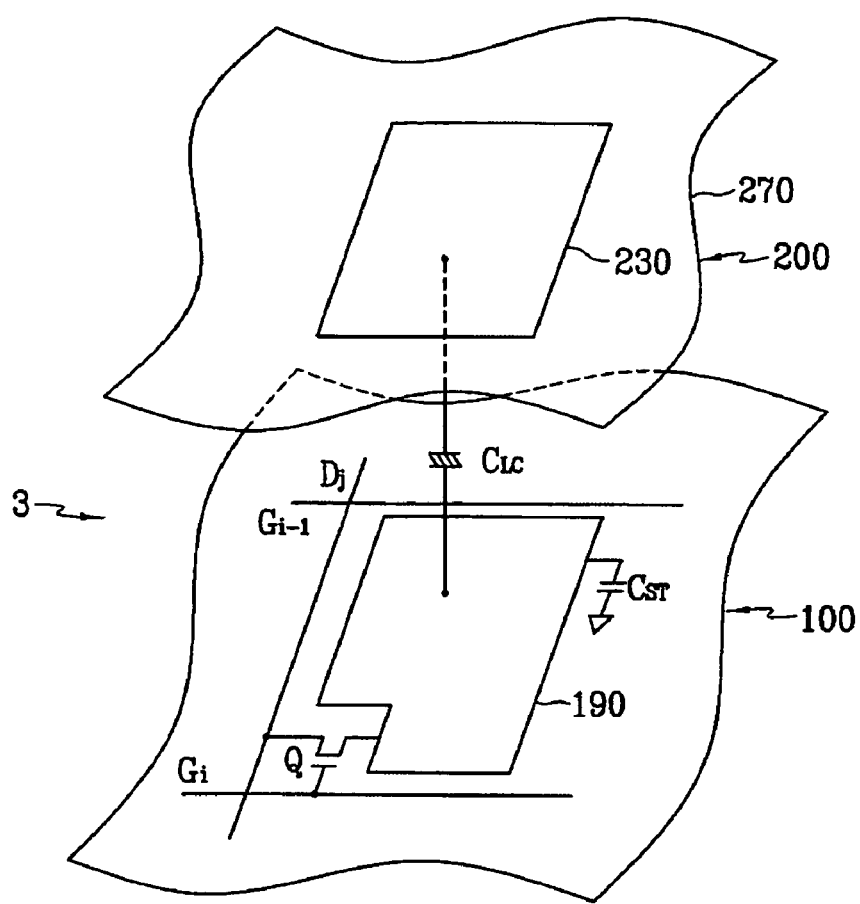
FIG. 2 is an equivalent circuit diagram showing a pixel of a liquid crystal display device according to an embodiment of the present invention.

FIG. 1 is a block diagram showing a display device according to an embodiment of the present invention, and FIG. 2 is an equivalent circuit diagram showing a pixel of a liquid crystal display device according to an embodiment of the present invention.

As shown in FIG. 1, the display device includes a panel assembly 300, a gate driver 400 and a data driver 500 connected to the panel assembly assembly 300, a gray voltage generating unit 800 connected to the data driver 500, and a signal control unit 600 for controlling the components.

As seen in the equivalent circuit diagram, the panel assembly 300 is connected to a plurality of signal lines $G_1$ to $G_n$, and $D_1$ to $D_m$ and includes a plurality of pixels arrayed substantially in a matrix.

The display signal lines $G_1$ to $G_n$ and $D_1$ to $D_m$ include a plurality of gate lines $G_1$ to $G_n$ for transmitting gate signals (sometimes referred to as "scan signals") and a plurality of data lines $D_1$ to $D_m$ for transmitting data signals. The gate lines $G_1$ to $G_n$ extend parallel to each other in a row direction, and the data lines $D_1$ to $D_m$ extend parallel to each other a column direction.

Each of the pixels include a switching element Q connected to display signal lines $G_1$ to $G_n$ and $D_1$ to $D_m$ and has a pixel circuit PX connected thereto.

The switching element Q has three terminals. Control and input terminals of the switching element Q are connected to the gate lines $G_1$ to $G_n$ and the data lines $D_1$ to $D_m$, and an output terminal thereof is connected to the pixel circuit PX. In addition, preferably, the switching element Q is a thin film transistor, and particularly, the switching element Q is made of an amorphous silicate.

In the case of a liquid crystal display, that is, a representative of flat display device, as shown in FIG. 2, a liquid crystal layer 3 is interposed between a lower panel 100 and an upper panel 200. The display signal lines $G_1$ to $G_n$ and $D_1$ to $D_m$ and the switching elements Q are disposed on the lower panel 100. The pixel circuit PX of the liquid crystal display device includes a liquid crystal capacitor $C_{LC}$ connected to the switching element Q and a storage capacitor $C_{ST}$. The storage capacitor $C_{ST}$ may be omitted if it is unnecessary.

Two terminals of the liquid crystal capacitor $C_{LC}$ are a pixel electrode 190 of the lower panel 100 and a common electrode 270 of the upper panel 200, and the liquid crystal layer 3 interposed between the two electrodes 190 and 270 serves as a dielectric member. The pixel electrode 190 is connected to the switching element Q, and the common electrode 270 covers the entire surface of the upper panel 200 to receive a common voltage $V_{com}$. Alternatively, both the pixel electrode 190 and the common electrode 270, which have shapes of bars or stripes, may be provided on the lower panel 100.

The storage capacitor $C_{ST}$ is an auxiliary capacitor for the LC capacitor $C_{LC}$. The storage capacitor $C_{ST}$ includes the pixel electrode 190 and a separate signal line (not shown), which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel uniquely represents one of three primary colors such as red, green, and blue colors (spatial division), or sequentially represents the three primary colors in time (temporal division), thereby obtaining a desired color. FIG. 2 shows an example of the spatial division in which each pixel includes a color filter 230 representing one of the three primary colors in an area of the upper panel 200 facing the pixel electrode 190. Alternatively, the color filter 230 is provided on or under the pixel electrode 190 on the lower panel 100.

A gray voltage generator 800 generates one set or two sets of gray voltages related to transmittance of the pixels. When two sets of the gray voltages are generated, the gray voltages in one set have a positive polarity with respect to the common voltage Vcom, while the gray voltages in the other set have a negative polarity with respect to the common voltage Vcom.

The gate driver 400 is connected to the gate lines $G_1$ to $G_n$ of the panel assembly assembly 300 to apply gate signals formed in a combination of a gate-on voltage Von and a gate-off voltage Voff to the gate lines $G_1$ to $G_n$.

The gate driver 400 is substantially a shift register including a plurality of stages connected to each other in a column.

The data driver 500 is connected to the data lines $D_1$ to $D_m$ of the panel assembly assembly 300 to select the gray voltage transmitted from the gray voltage generating unit 800 and apply the selected gray voltage as a data signal to the pixels.

Here, the gate driver 400 and the data driver 500 are constructed with a plurality of driving ICs, and in the embodiment of the present invention, the data driving IC and the data driving IC are mounted on the panel assembly assembly 300 in a COG scheme.

The signal controller 600 controls the gate driver 400, the data driver 500, and the like.

Now, the operation of the display device is described in detail.

The signal controller 600 is supplied with image signals R, G, and B, as well as input control signals. The input control signals, which are received from an external graphic controller (not shown), include, for example, a vertical synchronization signal Vsync, a horizontal synchronization signal Hsync, a main clock MCLK, and a data enable signal DE. After generating gate control signals CONT1 and data control signals CONT2 and processing the image signals R, G, and B for the panel unit 300, in response to the input control signals, the signal controller 600 provides the gate control signals CONT1 to the gate driver 400, and the processed image signals DAT and the data control signals CONT2 to the data driver 500.

The gate control signals CONT1 include a vertical synchronization start signal STV for informing the gate driver 400L and 400R of a start of a frame, a gate clock signal CPV for synchronizing the timing of the gate-on voltage Von, and an output enable signal OE that controls the duration of the gate-on voltage Von.

The data control signals CONT2 include a horizontal synchronization start signal STH for informing the data driver 500 of the start of a horizontal period, a load signal LOAD or TP for instructing the data driver 500 to apply the appropriate data voltages to the data lines $D_1$-$D_m$, and a data clock signal HCLK. The data control signals CONT2 may further include an inversion control signal RVS for reversing the polarity of the data voltages (with respect to the common voltage Vcom).

The data driver 500 receives the processed image signals DAT for a pixel row from the signal controller 600, and converts the processed image signals DAT into analog data voltages in response to the data control signals CONT2 from the signal controller 600. The levels of the analog data voltages are selected from the gray voltages supplied from the gray voltage generator 800

In response to the gate control signals CONT1 from the signal controller 600, the gate driver 400 applies the gate-on voltage Von to the gate lines $G_1$-$G_n$, thereby turning on the switching elements Q connected to the gate lines $G_1$-$G_n$.

The data driver 500 applies the data voltages to corresponding data lines $D_1$-$D_m$ for a duration of "one horizontal period" or "1H." This duration is equal to the duration of one periodic cycle of signals such as the horizontal synchronization signal Hsync, the data enable signal DE, and the gate clock signal CPV. The data voltages are then supplied to corresponding pixels via the turned-on switching elements Q.

The difference between the data voltage and the common voltage Vcom applied to a pixel is manifested as a charged voltage of the LC capacitor $C_{LC}$, i.e., a pixel voltage. The liquid crystal molecules have orientations depending on the magnitude of the pixel voltage, and those orientations determine the polarization of light passing through the LC capacitor $C_{LC}$. The polarizers convert light polarization into light transmittance.

By repeating the above-described procedure for each gate line, all gate lines $G_1$-$G_n$ are sequentially supplied with the gate-on voltage Von during a frame, thereby applying the data voltages to all pixels. When one frame finishes and the next frame starts, the inversion control signal RVS is applied to the data driver 500 such that the polarity of the data voltages for the next frame will be reversed ("frame inversion"). Alternatively, the inversion control signal RVS may be controlled such that the polarity of the data voltages in one frame is reversed for every row (e.g.: "row inversion"). Or, the polarity of the data voltages may be reversed for every column (e.g.: "column inversion").

Now, a panel assembly and a display device according to an embodiment of the present invention will be described in detail with reference to FIGS. 3 to 7.

Figure 3:
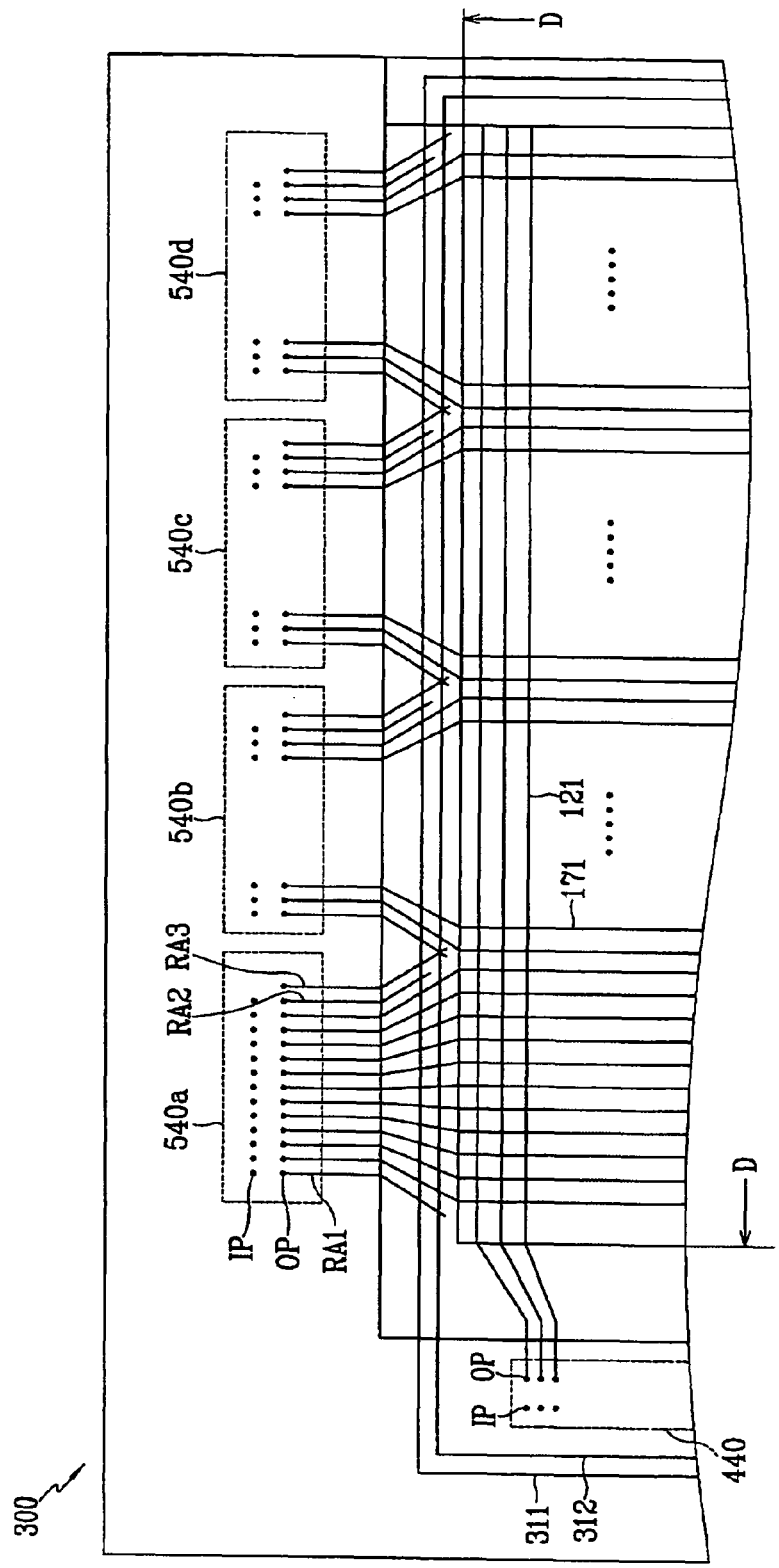
FIG. 3 is a schematic view of a display device according to an embodiment of the present invention.
Figure 4:
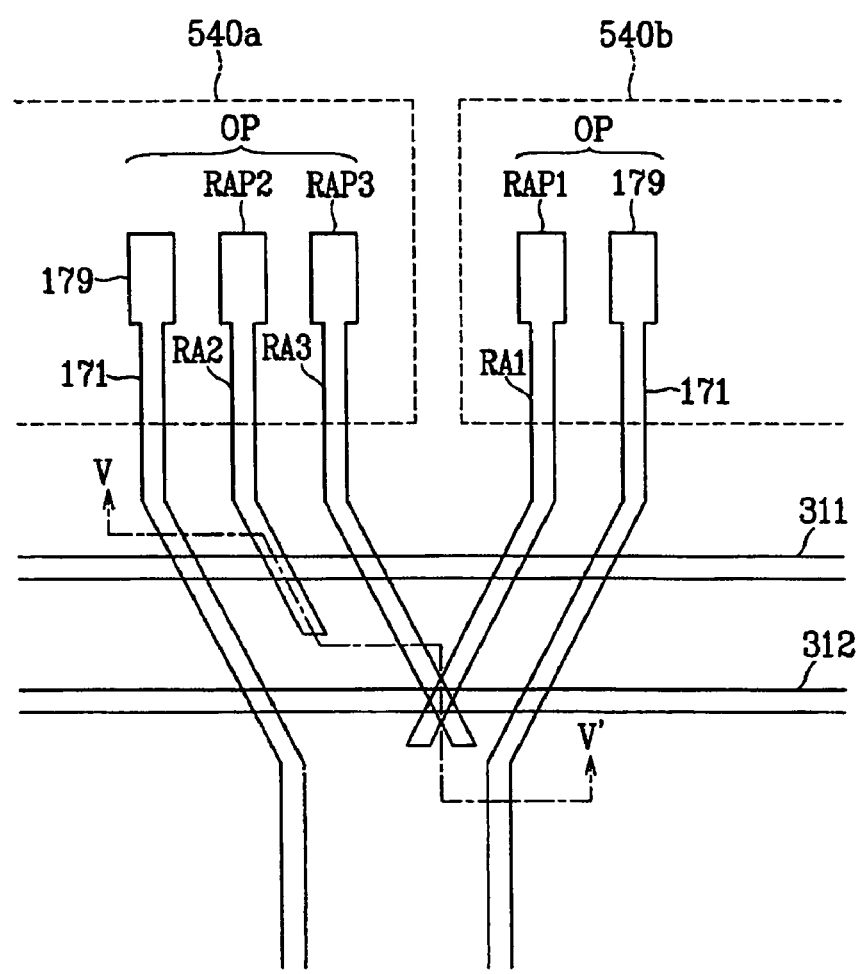
FIG. 4 is an enlarged view of a data driving IC region shown in FIG. 3.
Figure 5:
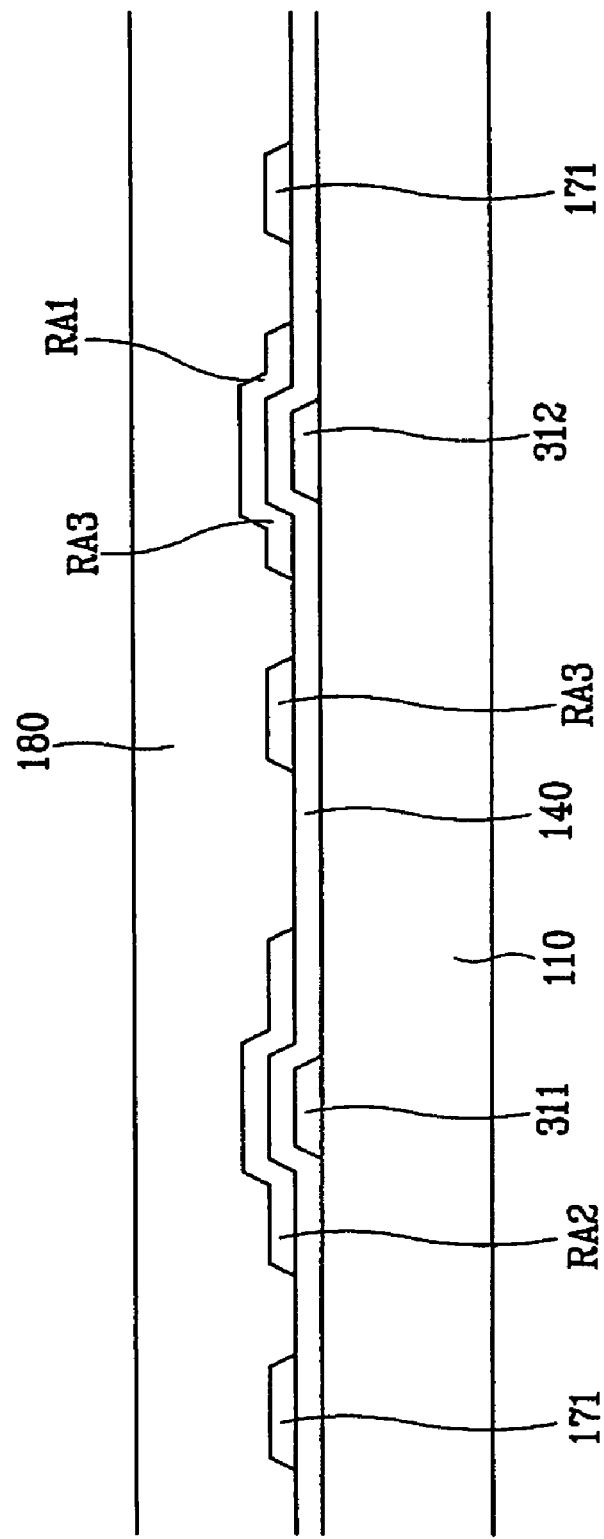
FIG. 5 is a cross sectional view showing a data driving IC region taken along line V-V' of FIG. 4.

FIG. 3 is a schematic view of a display device according to an embodiment of the present invention, FIG. 4 is an enlarged view of a data driving IC region shown in FIG. 3, and FIG. 5 is a cross sectional view showing a data driving IC region taken along line V-V' of FIG. 4.

Referring to FIGS. 3 to 5, the panel assembly assembly 300 of the display device according to the embodiment of the present invention includes a plurality of data driving IC regions 540a to 540d and a gate driving IC region 440.

Pixels and most of gate lines $G_1$ to $G_n$ and data lines $D_1$ to $D_m$ are disposed in a display region D of the panel assembly assembly 300, and data driving IC regions 540, a gate driving IC region 440, and a plurality of repair lines 311 and 312 are disposed in a peripheral region outside the display region D.

Here, the driving IC regions 440 and 540 are regions where a plurality of the driving ICs constituting a gate driver 400 and a data driver 500 are mounted, and the driving IC regions 440 and 540 are disposed at equal intervals.

On the other hand, the gate lines $G_1$ to $G_n$ and the data lines $D_1$ to $D_m$ are denoted by reference numerals 121 and 171, respectively.

In each of the driving IC regions 440 and 540, a plurality of input pads IP and a plurality of output pads OP are provided, and the gate lines 121 and the data lines 171 are connected to the output pads OP. In addition, a plurality of auxiliary repair lines RA1, RA2, and RA3 are connected to output pads OP disposed outside each of the data driving IC regions 540a to 540d.

An auxiliary repair line RA2 intersects the repair line 311, and auxiliary repair lines RA1 and RA3 intersect the repair line 312. In addition, the two auxiliary repair lines RA3 and RA1 between data driving IC regions, for example between the data driving IC region 540a and the data driving IC region 540b, intersect the repair line 312 at the same point.

Now, a structure of the panel assembly 300 having such an arrangement will be described with reference to FIGS. 4 and 5.

A pair of repair lines 311 and 312 made of a metal or a conductive material such as aluminum (Al), an aluminum alloy, a molybdenum (Mo), a molybdenum-tungsten (MoW) alloy, chromium (Cr), and tantalum (Ta) are disposed on an insulating substrate 110. Although not shown in the figures, gate lines are formed on the same layer.

Although the repair lines 311 and 312 may be constructed with a single layer, the repair lines 311 and 312 may be constructed with double layers or more. In this case, one layer is preferably made of a material having low resitivity, and another layer is made of a material having a property such that it can effectively contact other materials. For example, double layers of chromium and an aluminum alloy or double layers of molybdenum or a molybdenum alloy and aluminum may be employed.

A gate insulating layer 140 made of silicon nitride ($SiN_x$) is formed on the repair lines 311 and 312.

A plurality of data lines 171 and auxiliary repair lines RA1 to RA3 made of a metal or conductive material such as aluminum, an aluminum alloy, molybdenum, a molybdenum-tungsten alloy, chromium, and tantalum are formed on the gate insulating layer 140. Here, widths of end portions 179 and RAP1 to RAP3 of the data lines 171 and the auxiliary repair lines RA1 to RA3 are enlarged to constitute output pads OP.

In addition, as described above, the two auxiliary repair lines RA3 and RA1 between the data driving IC regions 540a to 540d are connected to each other at the same point of the repair line 312.

Although the data lines 171 and the auxiliary repair lines RA1 to RA3 may be constructed with a single layer similar to the repair lines 311 and 312, the data lines 171 and the auxiliary repair lines RA1 to RA3 may alternately be constructed with double layers or more. In a case where the lines are constructed with the double layers or more, one layer is preferably made of a material having low resitivity, and another layer is made of a material having a property such that it can effectively contact other materials.

A passivation layer 180 constructed with a silicon nitride layer or an organic insulating layer is formed on the data lines 171, the auxiliary repair lines RA1 to RA3, and the gate insulating layer 140.

Now, a gross test process according to an embodiment of the present invention will be described with reference to FIGS. 6 and 7.

Figure 6:
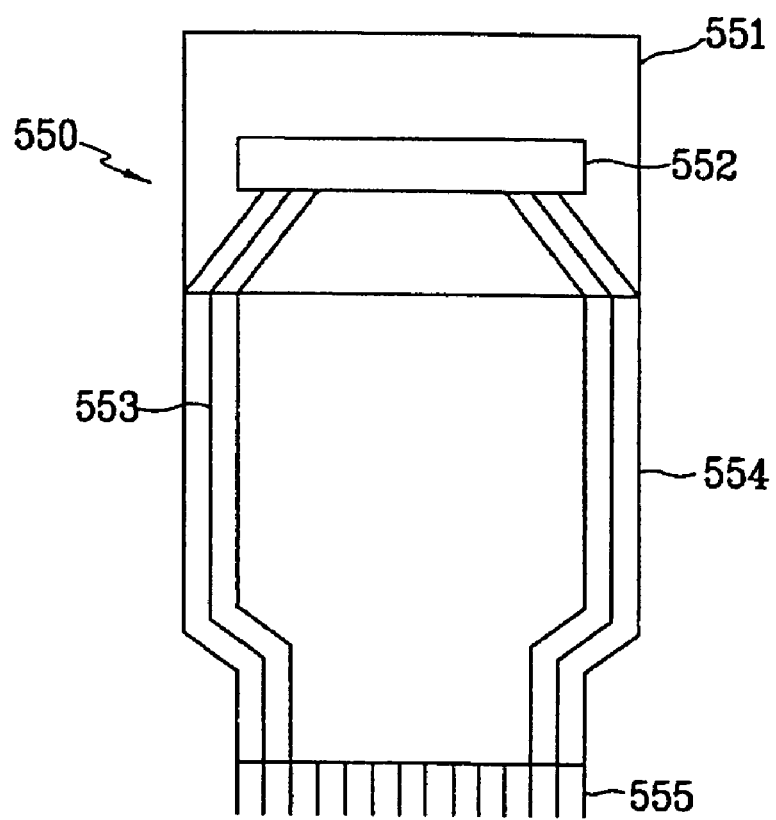
FIG. 6 is a view showing an example of a test unit used to test a display device according to an embodiment of the present invention.
Figure 7:
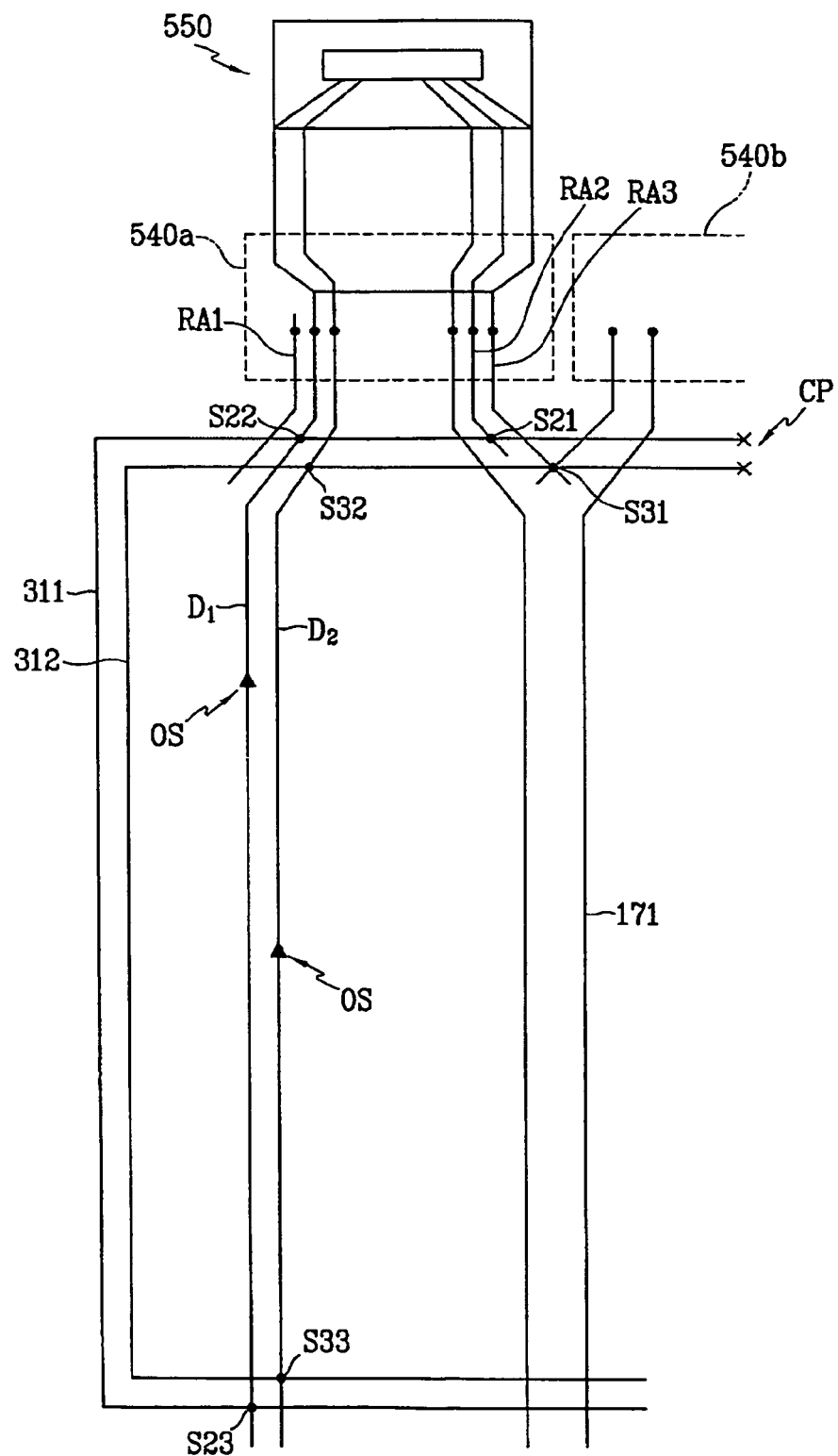
FIG. 7 is a view showing an example of a test of success in repairing after a repairing process is performed in the display device according to the embodiment of the present invention.
Figure 8:
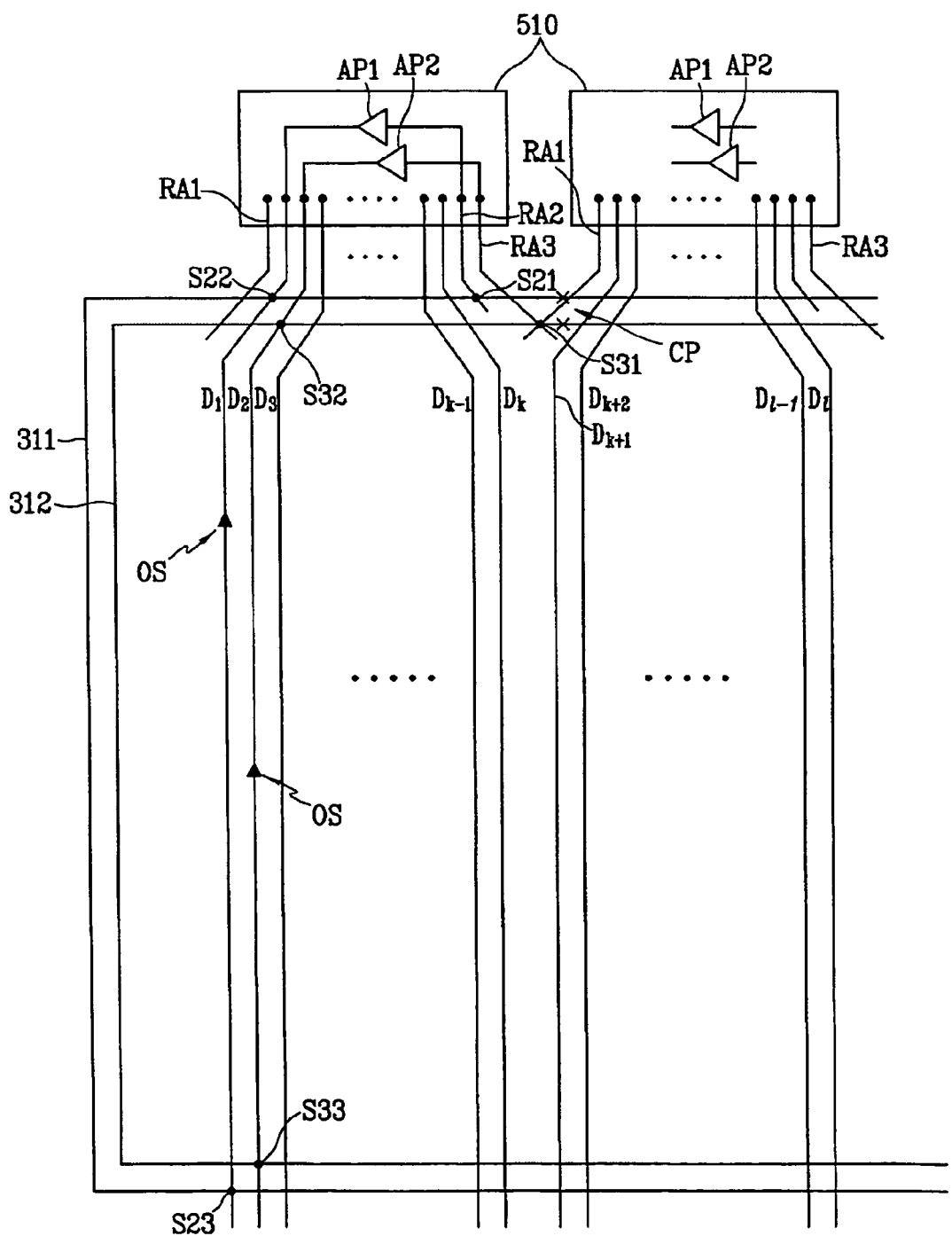
FIG. 8 is a view showing an example of a repaired state of the display device according to the embodiment of the present invention.

FIG. 6 shows an example of a gross test unit according to an embodiment of the present invention, FIG. 7 shows an example of a test performed after a repair process is performed by using the gross test unit shown in FIG. 6, and FIG. 8 shows an example of a repaired state.

The gross test unit 550 shown in FIG. 6 is a TCP type of gross test unit. The TCP type of gross test unit is used in a case where the data driving ICs are mounted in a TCP scheme. However, in the embodiment of the present invention, when the data driving ICs are directly mounted on the panel assembly in a COG scheme by using the TCP type of test unit, on occurrence of disconnection of the data lines is tested. In addition, as described above, the gross test has two steps. The first step is a test on occurrence of disconnection, and the second step is a test of success in repairing the disconnection.

As shown in the figure, the TCP type gross test unit 550 includes a test data driving IC 552, a TCP 551 where the test data driving IC 552 is mounted, signal lines 553 which extend from the data driving IC 552, connection portions 554 which are provided with most of the signal lines 553 and that have tapered ends, and probes 555 which are connected to the signal lines 553.

The test data driving IC 552 is the same as the data driving ICs which are mounted on the data driving IC regions 540a to 540d. However, there is a difference in that the test data driving IC 551 is mounted on the TCP 511, that is, in the TCP scheme, and the actual data driving ICs are mounted in the COG scheme.

In addition, the connection portions 554 are formed in a shape of enlarging the TCP 551 and constitute a portion of the TCP 551.

Firstly, the occurrence of disconnection of the data lines 171 is tested by contacting the probes 555 of the test unit 550 to the output pads OP connected to the data lines 171 and applying a test signal thereto. At this time, a signal is applied after the probes 555 of the test unit 550 are allowed to contact remaining portions 179, RAP2, and RAP3 excluding the pad PAP1 of the auxiliary repair line RA1.

Next, as shown in FIG. 7, in a case where first and second data lines $D_1$ and $D_2$ have a disconnection, the auxiliary repair line RA2 and the repair line 311 are connected to each other by forming a short-circuited point S21 with laser illumination, and the repair line 311 and upper and lower portions of the first data line $D_1$ are connected to each other by forming short-circuited points S22 and S23. By doing so, the auxiliary repair line RA1 and the first data lines $D_1$ are connected to each other. Similarly, the auxiliary repair line RA3, the repair line 312, and the second data lines $D_2$ are connected to each other by forming three short-circuited points S31, S32, and S33.

Next, it is checked whether or not the repairing process has succeeded by applying check signals through the auxiliary repair lines RA2 and RA3. Unlike the COG type of test unit where two signals are output from one side thereof, since two check signals are output, from both sides in the TCP type of test unit, it is possible to accurately check the success in repairing by forming an additional auxiliary repair line RA3.

Next, if the repairing succeeds, the data driving IC 510 is mounted and a signal is applied thereto, as shown in FIG. 8. At this time, the data driving IC 510 includes a plurality of amplifiers AP1 and AP2. The amplifier AP1 is connected between the short-circuited point S22 and the short-circuited point S21 through the output pad OP so as to constitute a kind of a current path, and the amplifier AP2 is connected between the short-circuited point S32 and the short-circuited point S31 through the output pad OP so as to constitute another current path. Therefore, the data voltage output to the first data line $D_1$ is amplified by the amplifier AP1 to be divided at the short-circuited point S22 into the repair line 311, the data line $D_1$, and the short-circuited point S21, and the data voltage output to the second data line $D_2$ is also divided at the short-circuited point S32 into the repair line 312, the data lines $D_2$, and the short-circuited point. Accordingly, the data voltage is applied to the upper and lower portion of the disconnected portion OS. At the same time, a portion of the data voltage is amplified again by the amplifiers AP1 and AP2 and, after that, output. In this way, in addition to the auxiliary repair lines RA1 and RA2, the separate auxiliary repair line RA3 is provided, so that it is possible to test the occurrence of disconnection and the repaired state of the data lines connected in the COG scheme by using the TCP type test unit.

Accordingly, production costs involved in manufacturing the COG type of test unit can be reduced, and the repaired state can be completely tested so that it is possible to implement a mass production system.

In addition, the test scheme can be implemented with modification of design of a mask for disposing an additional auxiliary repair line RA3 to the panel assembly 300 without modification of design of the COG type of data driving ICs, so there is no need for costs involved with modification of design. Moreover, since the auxiliary repair line RA3 is disposed between the data driving IC regions 540a to 540d, there is no need for a separate space.

As described above, by disposing an additional auxiliary repair line RA3 at the right side of each of the data driving IC regions 540a to 540d, it is possible to greatly reduce costs involved with the COG type of gross test unit.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

What is claimed is:

1. A panel assembly for a display device, comprising:
   a display region including a plurality of pixels and most of display signal lines connected to the pixels;
   a plurality of repair lines disposed in a shape of a ring in a peripheral region outside of the display region; and
   first to third auxiliary repair lines disposed in the peripheral region,
   wherein the display signal lines comprise data lines for transmitting data voltages;
   wherein the first to third auxiliary repair lines are not connected to any signal line that intersects the data lines, except the repair lines, and do not intersect the data lines, and
   wherein the data lines are disposed between the first auxiliary repair line and the second auxiliary repair line.

2. The panel assembly of claim 1, wherein the second auxiliary repair line and the third auxiliary repair line are adjacent to each other.

3. The panel assembly of claim 2, wherein the first to third auxiliary repair lines intersect at least one of the repair lines.

4. The panel assembly of claim 3, further comprising a plurality of data driving IC regions where data driving ICs for generating data voltages and applying the data voltages to the data lines of the display signal lines are mounted.

5. The panel assembly of claim 4,
   wherein the first to third auxiliary repair lines are disposed in the data driving IC regions, and
   wherein the third auxiliary repair line and the first auxiliary repair line disposed in the adjacent data driving IC regions intersect one of the repair lines at the same point.

6. The panel assembly of claim 5, wherein the data driving IC regions are disposed at equal intervals.

7. A display device comprising:
   a panel assembly including:
      a display region including a plurality of pixels and most of display signal lines connected to the pixels;
      a plurality of repair lines disposed in a shape of a ring in a peripheral region outside of the display region, first to third auxiliary repair lines disposed in the peripheral region in parallel to data lines of the display signal lines for transmitting data voltages; and a plurality of data driving IC regions where data driving ICs for generating data voltages and applying the data voltages to the data lines of the display signal lines are mounted, wherein the first to third auxiliary repair lines are disposed in the data driving IC regions, and wherein the third auxiliary repair line and the first auxiliary repair line disposed in adjacent data driving IC regions intersect one of the repair lines at the same point.

8. The display device of claim 7, wherein the data lines are disposed between the first auxiliary repair line and the second auxiliary repair line.

9. The display device of claim 8, wherein the second auxiliary repair line and the third auxiliary repair line are adjacent to each other.

10. The display device of claim 9, wherein the first to third auxiliary repair lines intersect at least one of the repair lines.

11. The display device of claim 7, wherein the data driving IC regions are disposed at equal intervals.

12. The display device of claim 7, wherein the data driving ICs are mounted in a COG scheme.

13. The display device of claim 7, wherein the panel assembly further comprises data driving IC regions where data driving ICs for applying the data voltages to the data lines of the display signal lines are mounted, and wherein contact portions are formed by end portions of the first to third auxiliary repair lines and the data lines having a larger width than a remaining portion of the first to third auxiliary repair lines and the data lines, respectively, the contact portions disposed in the data driving IC regions.

14. The display device of claim 13, wherein in a case where at least one of the second auxiliary repair line and the third auxiliary repair line is connected to the repair line, a test unit where a test IC the same as the data driving IC is mounted applies a test signal to the contact portion.

15. The display device of claim 14, wherein the test unit comprises:

a TCP (tape carrier package) where the test IC is mounted; and a probe connected to a signal line which extends from the test IC.

16. The display device of claim 15, wherein a portion of the probe is connected to a contact portion formed by enlarging the data line, and a remaining portion thereof is connected to contact portions formed by enlarging the second and third auxiliary repair lines.

17. The display device of claim 15, wherein the data driving ICs are directly mounted on the panel assembly.

18. The display device of claim 15, wherein the data driving IC regions are disposed at equal intervals.

19. A panel assembly for display device, comprising:

a plurality of data lines for transmitting data voltages;

a plurality of data driving IC regions where data driving ICs for generating the data voltages and applying the data voltages to the data lines are disposed;

a plurality of auxiliary repair lines which are formed in the data driving ICs and are disposed asymmetrically at both sides of the data lines, and a plurality of repair lines intersecting at least one of the auxiliary repair lines;

wherein the auxiliary repair lines do not intersect the data lines, and wherein the auxiliary repair lines are not connected to any signal line that intersects the data lines, except the repair lines.

20. The panel assembly of claim 19, wherein some of the auxiliary repair lines are adjacent to each other.

21. The panel assembly of claim 20, wherein the data driving IC regions are disposed at equal intervals.

22. The panel assembly of claim 5, wherein the first to third auxiliary repair lines are disposed asymmetrically at both sides of the data lines.

* * * * *